United States Patent [19]
Byrd

[11] Patent Number: 6,081,899
[45] Date of Patent: Jun. 27, 2000

[54] TIME STAMP AUTHORITY HIERARCHY PROTOCOL AND ASSOCIATED VALIDATING SYSTEM

[75] Inventor: Marc Byrd, Cupertino, Calif.

[73] Assignee: Netscape Communications Corporation, Mountain View, Calif.

[21] Appl. No.: 09/005,321

[22] Filed: Jan. 9, 1998

[51] Int. Cl.⁷ .................................................. H04K 1/00
[52] U.S. Cl. ............................ 713/201; 710/61; 380/30; 380/25; 380/23
[58] Field of Search .................................... 713/200, 201, 713/155, 157, 176, 178; 710/61; 380/30, 25, 23

[56] References Cited

U.S. PATENT DOCUMENTS

| | | | |
|---|---|---|---|
| 5,136,643 | 8/1992 | Fischer ........................................ | 380/23 |
| 5,189,700 | 2/1993 | Blandford ................................. | 713/178 |
| 5,500,897 | 3/1996 | Hartman, Jr. ............................ | 713/178 |
| 5,680,639 | 10/1997 | Milne et al. ............................ | 395/806 |
| 5,930,479 | 7/1999 | Hall ...................................... | 395/200.68 |

OTHER PUBLICATIONS

United States Postal Service, "Introducing the new Electronic Postmark from the United States Postal Service" by Aegis.

*Primary Examiner*—Robert W. Beausoliel, Jr.
*Assistant Examiner*—James G. Weir
*Attorney, Agent, or Firm*—Michael A. Glenn; Kirk Wong

[57] ABSTRACT

A time authority is established within a trusted time authority hierarchy which is periodically updated with the current date and time by the time authority. The user trusts the time authority and the associated hierarchy. Servers in the chain of the established authority are authorized to stamp a message with the time and date and encode the message so the recipient knows whether the message has been tampered with since the date stamp was attached. Existing browser security features are used to provide the tamper-proof mechanism. Messages are sent to trusted outgoing mail servers and are time stamped, encoded with the time authority's digital signature for tamper protection, and are also encrypted according to the user's preferences. The message is then routed to the intended recipient whose mail reader receives the message, decodes the time authority's digital signature for tamper detection, and decrypts the message if it has been encrypted. Incoming mail servers can also be added to the trusted time authority hierarchy. The incoming mail server time stamps incoming mail before forwarding it to the receiving user and sends a time stamped return receipt to the sender if the user has selected that option and the receiver permits it.

18 Claims, 5 Drawing Sheets

Netscape: Edit A Certification Authority — 101

This Certificate belongs to:
Class 1 Public Primary certification Authority
VeriSign, Inc.
US
Serial Number: 02:A4:00:00:01
This Certificate is valid from Mon Jan 29, 1996 to Fri Dec 31, 1999
00:EC:35:D1:64:A0:B9:24:16:79:C0:64:C1:06:48:84

This Certificate was issued by:
Class 1 Public Primary certification Authority
VeriSign, Inc.
US

— 102

This Certificate belongs to a Certifying Authority

☐ Accept this Certificate Authority for Certifying network sites
☒ Accept this Certificate Authority for Certifying e-mail users
☐ Accept this Certificate Authority for Certifying software developers

— 103

☐ Warn before sending data to sites certified by this authority

*FIG. 1*
*(PRIOR ART)*

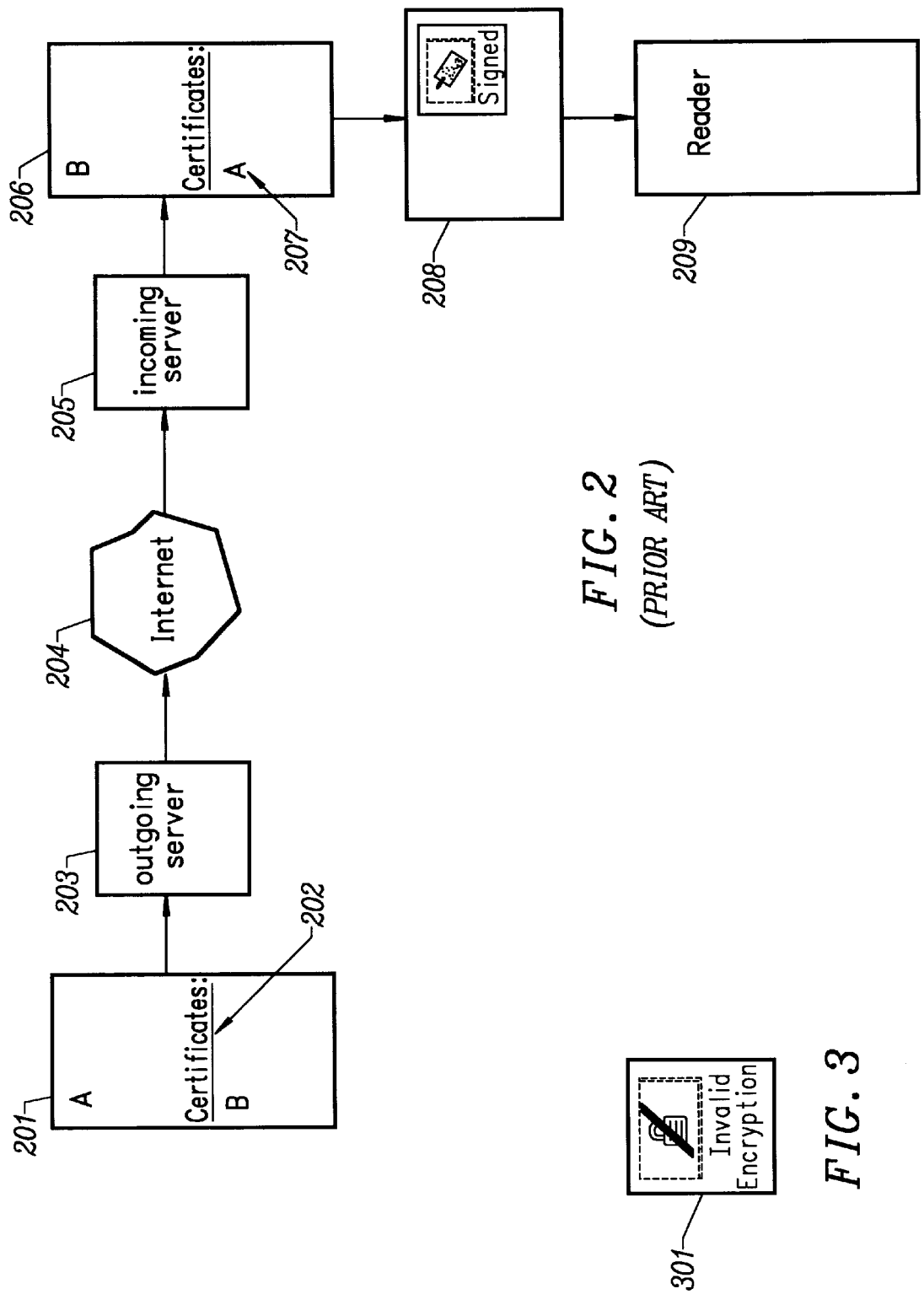

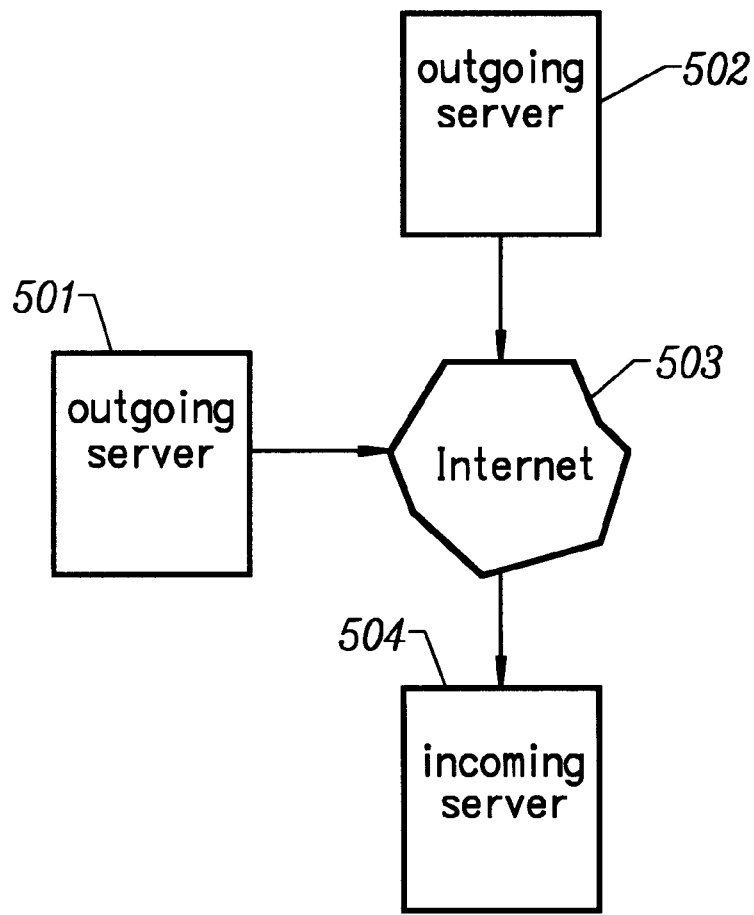
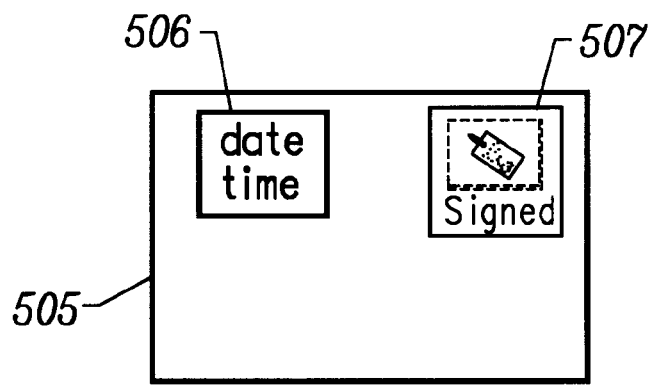
FIG. 5

TIME STAMP AUTHORITY HIERARCHY PROTOCOL AND ASSOCIATED VALIDATING SYSTEM

BACKGROUND OF THE INVENTION

1. Technical Field

The invention relates to the transmission and receipt of electronic mail in a computer environment. More particularly, the invention relates to the time and date stamping of electronic messages and commerce using a trusted entity across a computer network.

2. Description of the Prior Art

Electronic mail (email) services have become heavily relied upon in the business and private sectors. The use of email has dramatically increased in the last few years. However, one feature that has been missing from the current email systems is a trustworthy time stamp for email messages and electronic commerce. Time sensitive messages and transactions could be then transmitted electronically rather than through conventional mail. Such a time stamp would have to be trusted so the recipient can trust that the time and date on the message is accurate and has not been tampered with.

Generally, a computer's date and clock parameters are easily modified by unprivileged users. These date and clock settings are used to tag electronic messages and commerce. There was no way to trust the time and date of a message even if it was signed and/or encrypted.

One approach to this problem uses a centralized, proprietary mail system. It requires the sender to send the document that requires the time and date stamp to a central server. The server receives the document and stamps it with the current date and time and attaches the digital signature of the post office. The digital signature is used to indicate if the message has been tampered with. If the signature is invalid when the message reaches the recipient, then the message has been tampered with.

The resulting message is routed to the recipient. The recipient is required to have a proprietary mail reader installed on his computer that contains a public key that is used to decode the document. The U.S. Postal Authority approach allows any recipient that has the mail reader installed on their computer to open any mail even though it was not intended for the recipient because only one public key is used across the system.

The sender's documents are archived at the server's location which is meant to provide some redundancy for the sender, but allows for multiple copies of the sender's document to exist and possibly be breached. The sender's privacy is not assured using this approach.

Although most Internet browsers use a standards based mail system (Simple Mail Transfer Protocol (SMTP), Post Office Protocol (POP), Hypertext Markup Language (HTML) embedded in the Multipurpose Internet Mail Extensions (MIME)) which are easily readable by third parties, this approach is proprietary and closed. It has a top level trusted authority (the U.S. Postal Authority) and the architecture is very flat; the user has to deal directly with the authority. There is also no trust hierarchy which reduces the scalability of the system.

It would be advantageous to provide a time stamp authority hierarchy protocol and associated validating system that integrates with the security system of the user's Internet browser and a standards-based mail system while transparently allowing the user's local server to time stamp the user's messages. It would further be advantageous to provide a time stamp authority hierarchy protocol and associated validating system that does not require that the recipient have a specialized mail reader.

SUMMARY OF THE INVENTION

The invention provides a time stamp authority hierarchy protocol and associated validating system. The invention uses an easily configured message trusting system that time stamps and encodes the user's messages and is integrated with the existing security system of the user's Internet browser and its associated mail system. In addition, the invention capitalizes on the Internet browser's existing capabilities and does not require a specialized mail reader.

In a preferred embodiment of the invention, a central time authority is established with a trusted time authority hierarchy. The user trusts the time authority and the associated hierarchy. The trusted time authority hierarchy is periodically updated with the current date and time by the central time authority. Servers in the chain of the established authority are authorized to stamp a message with the time and date and encode the message so the recipient knows whether the message has been tampered with since the time of the date stamp. The Internet browser's existing security features are used to provide for the tamper-proof mechanism.

Messages are sent to trusted outgoing mail servers and are time stamped and encoded with the time authority's digital signature for tamper protection. The server also encrypts the message according to the user's preferences. The message is then routed to the intended recipient.

The recipient's mail reader receives the message, decodes the time authority's digital signature for tamper detection and decrypts the message if it has been encrypted.

Incoming mail servers can also be added to the trusted time authority hierarchy. The incoming mail server time stamps incoming mail before forwarding it to the receiving user. A time stamped return receipt may optionally be sent to the sender if the user has selected that option.

Other aspects and advantages of the invention will become apparent from the following detailed description in combination with the accompanying drawings, illustrating, by way of example, the principles of the invention.

BRIEF DESCRIPTION OF THE DRAWINGS

FIG. 1 is a schematic diagram of a browser preferences page for editing a certificate authority according to the invention;

FIG. 2 is a block schematic diagram of a message route through an Internet browser scenario according to the invention;

FIG. 3 is a diagram of an invalid encryption symbol showing that a message has been tampered with according to the invention;

FIG. 5 is a block schematic diagram of an incoming server added to the trusted authority hierarchy according to the invention.

DETAILED DESCRIPTION OF THE INVENTION

Figure 4:
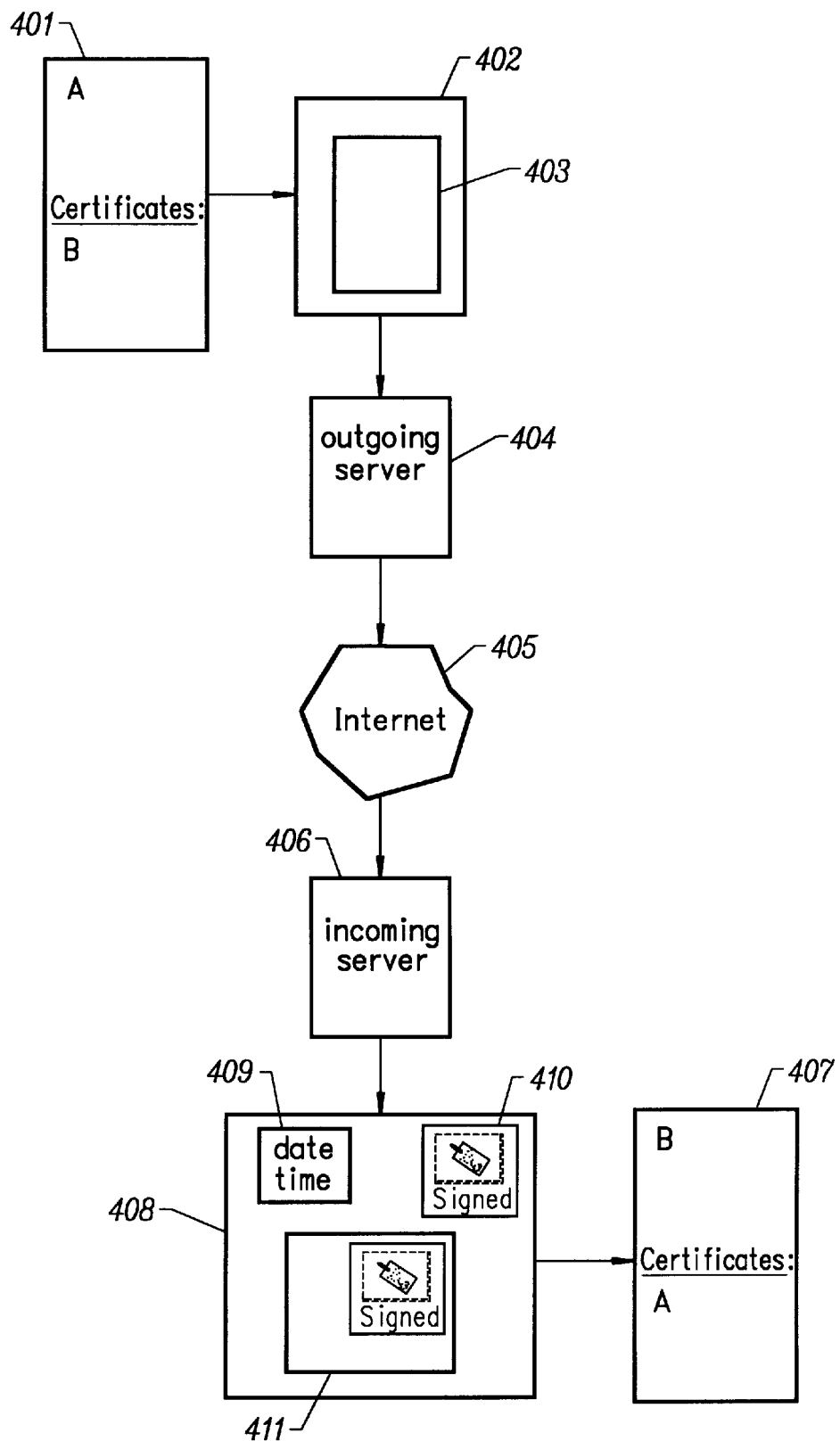
FIG. 4 is a block schematic diagram of a message route through a preferred embodiment of the invention according to the invention.

As shown in the drawings for purposes of illustration, the invention is embodied in a messaging trusting protocol system for electronic messaging and commerce. A system according to the invention provides a message trusting protocol that is integrated into the existing security system of Internet browsers and servers, thereby providing a transparent system for time and date stamping of electronic messages and commerce in a trusted environment. Existing solutions require proprietary standards and programs to perform trusted time and date stamping.

A large majority of computers have date and clock parameters that are easily modified by unprivileged users. These date and clock settings are used to tag electronic messages and commerce. The invention establishes a trusted entity at the top level that is the overall time authority. Multiple top level time authorities can exist in a system. For example, a top level authority may exist in each country, e.g., the United States, Canada, Japan, and China. The user simply selects the desired top level authority. Referring to FIG. 1, the user establishes trust with the time stamp authority in the Internet browser 101 in the same way that the user trusts a signature authority, such as Verisign 102. The user selects the scope of the authority given to the entity 103. In this example, Verisign extends the authority given to it to other entities. When the user trusts Verisign, the trust extends to any entities that Verisign trusts, which, with the popularity of digital signatures, which in the present embodiment would include the user's local mail server. This establishes a hierarchy of authorities.

The user trusts the overall time authority. Servers in the chain of the established authority are authorized to stamp a message with the time and date and encode the message so the recipient knows whether the message has been tampered with since the date stamp. The Internet browser's existing security features are used to provide for the tamper-proofing mechanism.

With respect to FIGS. 2 and 3, in the current Internet browser security setup, user A's database 201 has a certificate, a digital signature from user B 202. That certificate is issued by a trusted authority. Somewhere in the trust chain is someone that user A trusts. User B 206 similarly has user A's digital certificate 207. When user A 201 sends a message, he can do one of two things: sign it with his certificate, or use a combination of A's and B's certificate information to encrypt the message. The system does not need to encrypt the message to tell if the message has been tampered with, the reason for encryption is so a third party cannot read the message. The digital signature is adequate for tamper detection.

The message 208 is received by user B 206 and is opened by the reader 209 in the Internet browser. The message reader 209 in the Internet browser handles the nested message encrypting. If the message 208 has been altered in any way it appears as an invalid signature or encryption 301 (FIG. 3). The outgoing 203 and incoming 205 servers and the Internet 204 are transparent. The user does not know that they exist. It is important that the servers do not alter the message in any way which makes them transparent to the user.

Referring to FIG. 4, the invention adds the outgoing mail server 404 to the chain of trust of the time stamp authority. The outgoing mail server 404 automatically encodes the message further so the resulting message that is transferred looks like the original 403, with a payload around the message containing the time stamp and the time authority's signature 402. The resulting message can be encrypted, based on the user's preferences, using the recipient's key, or all three (user A, user B, and the time authority) keys. User B 407 receives a message 408 with the date and time 409 and the time stamp authority's certificate 410 that tells whether the message was tampered or not. The second layer 411 is the original message which has not been altered, only encapsulated.

The user sets his time authority preferences in the Internet browser. He selects the option of whether the trusted authority is local or a third party arbitrator. The invention uses the Internet browser's existing security model and the chain of trust. The sender controls his server through his preferences and the receiver controls his server in the same manner.

With respect to FIG. 5, a trusted server can be added on the incoming side 504 of the user's site. In this case, the incoming server 504 is trusted while the outgoing servers 501, 502 of users that are not compatible with the time stamp authority hierarchy are not trusted. The incoming server 504 time stamps the incoming message so the user knows when the message was received and the approximate transit time of the message. A return receipt 505 can be sent back to the sender that is a time stamped 506 and digitally signed 507 return receipt may optionally be sent indicating the time that the server 504 received the message.

The top level authority is a central time authority which obtains its time from a trusted time source (e.g. it can read the Navy's atomic clock). It sends the chain of trusted time authorities a periodic time update. The chain of trust is only valid for a certain amount of time and it must be updated. Each level has a different time length of trust, e.g., the top level is always trusted, the second level is only trusted for a certain amount of time, etc.

Figure 6:
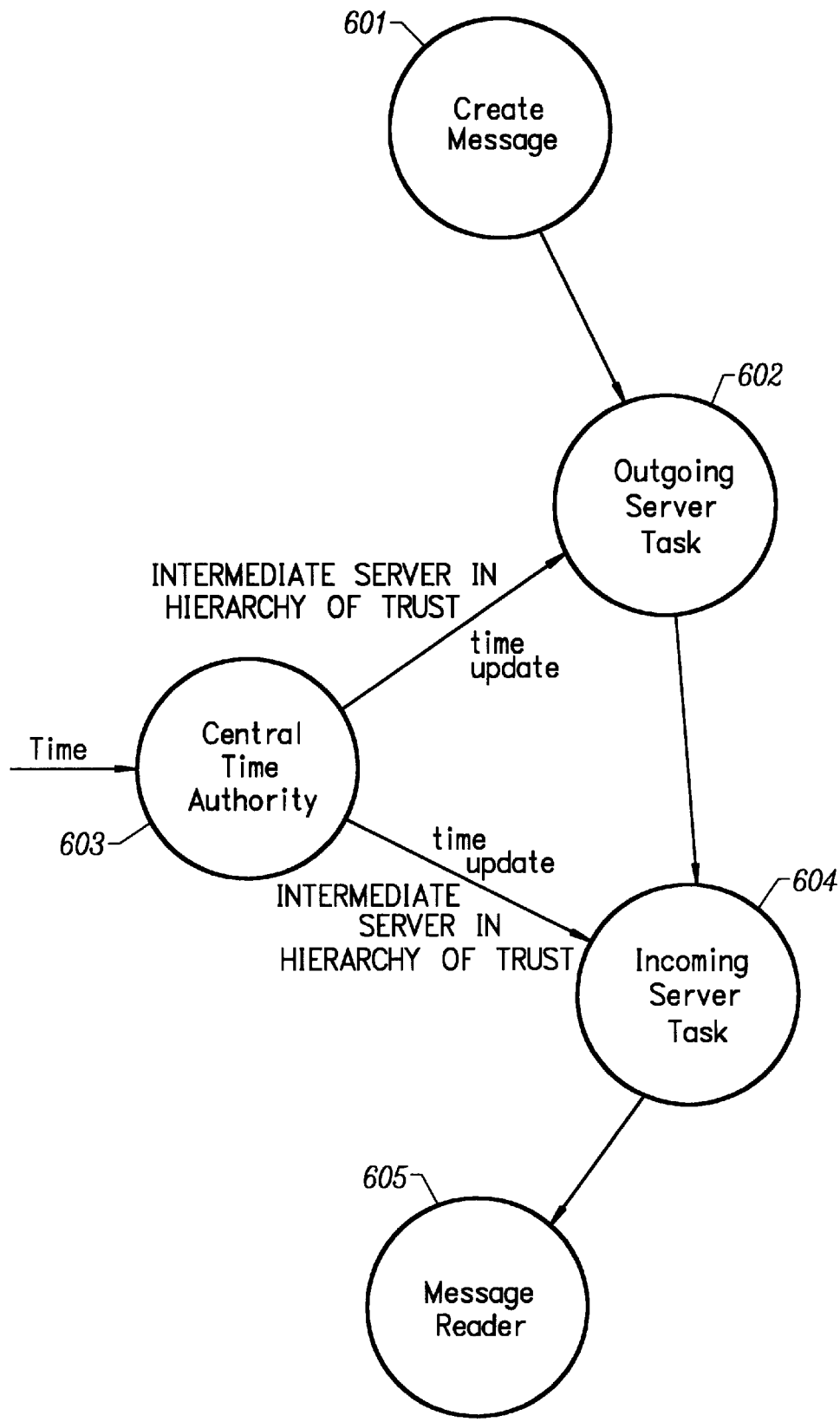
FIG. 6 is a block schematic diagram of a task oriented view of a preferred embodiment of the invention according to the invention.

Referring to FIG. 6, the create message module 601 is integrated into the browser's mail program and uses the user's preferences to send the message to the preferred time stamp server. The outgoing server task 602 time stamps the message and, if the user has selected the option, encrypts the message. It then attaches a digital signature to the message to encode the message for tamper protection.

The incoming server task 604 receives the message and forwards it to the message reader module 605. If the incoming server task 604 is a trusted time entity, then it time stamps the message before forwarding it to the message reader module 605 and sends a time stamped return receipt to the sender if the receiving user has selected that option.

The message reader module 605 decodes the time authority signature to check for tampering and unencrypts the outer layer of the message if it has been encrypted. The message reader module 605 is the same message reader that exists in the browser and the results of the tamper detection are indicated to the user. The invention capitalizes on the existing security functionality of the browser.

Periodic time updates are sent from the central time authority 603 to all of the outgoing 602 and incoming 604 server tasks that are part of the time authority hierarchy. The central time authority 603 updates its own clock from a trusted time source.

Although the invention is described as being applied to Internet browsers and electronic mail, one skilled in the art can readily appreciate that the invention has many other applications.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

I claim:

1. A process for time stamping electronic messages sent by a user across a computer network, comprising the steps of:

creating a trusted time source;

creating a central time authority, wherein said central time authority updates an internal clock from said trusted time source;

establishing a trusted time authority hierarchy, wherein said hierarchy is trusted by said user;

creating a message to be sent to an intended recipient;

providing an outgoing mail server as part of said hierarchy;

forwarding said message to said outgoing mail server; and sending said message to said intended recipient;

wherein said central time authority sends periodic time updates to the trusted servers in said hierarchy;

wherein said outgoing mail server stamps said message with a current time and date; and wherein said outgoing mail server attaches a time authority digital signature to said message for tamper protection.

2. The process of claim 1, wherein said outgoing mail server encrypts said message according to said user's preferences.

3. The process of claim 1, further comprising the step of:

receiving said message.

4. The process of claim 1, further comprising the step of:

decoding said digital signature of said message for tamper detection and notifying the user of the results.

5. The process of claim 2, further comprising the step of:

unencrypting said message.

6. The process of claim 1, further comprising the step of:

establishing an incoming mail server as part of said hierarchy, said incoming mail server time stamps incoming messages.

7. The process of claim 6, wherein said incoming mail server sends a time stamped return receipt to the sender according to the preferences set by the receiving user.

8. The process of claim 1, wherein said outgoing mail server is a third party arbitrator.

9. The process of claim 1, wherein said outgoing mail server is a local server to said user.

10. An apparatus for time stamping electronic messages sent by a user across a computer network in a trusted environment, comprising:

a trusted time source;

a central time authority, wherein said central time authority updates an internal clock from said trusted time source;

a trusted time authority hierarchy, wherein said hierarchy is trusted by the user;

a module for creating a message to be sent to an intended recipient;

an outgoing mail server provided as part of said hierarchy;

a module for forwarding said message to said outgoing mail server; and a module for sending said message to said intended recipient;

wherein said central time authority sends periodic time updates to the trusted servers in said hierarchy;

wherein said outgoing mail server stamps said message with the current time and date; and wherein said outgoing mail server attaches a time authority digital signature to said message for tamper protection.

11. The apparatus of claim 10, wherein said outgoing mail server encrypts said message according to said user's preferences.

12. The apparatus of claim 10, further comprising:

a module for receiving said message.

13. The apparatus of claim 10, further comprising:

a module for decoding said digital signature of said message for tamper detection and notifying the user of the results.

14. The apparatus of claim 11, further comprising:

a module for unencrypting said message.

15. The apparatus of claim 10, further comprising:

a module for establishing an incoming mail server as part of said hierarchy, wherein said incoming mail server time stamps incoming messages.

16. The apparatus of claim 15, wherein said incoming mail server sends a time stamped return receipt to the sender according to the preferences set by the receiving user.

17. The apparatus of claim 10, wherein said outgoing mail server is a third party arbitrator.

18. The apparatus of claim 10, wherein said outgoing mail server is a local server to said user.

\* \* \* \* \*